United States Patent [19]

Arimoto

[11] Patent Number: 4,686,577
[45] Date of Patent: Aug. 11, 1987

[54] ORIGINAL READING APPARATUS WITH POSITIONING CHECK

[75] Inventor: Shinobu Arimoto, Tokyo, Japan

[73] Assignee: Canon Kabushiki Kaisha, Tokyo, Japan

[21] Appl. No.: 677,096

[22] Filed: Nov. 30, 1984

[30] Foreign Application Priority Data

Dec. 8, 1983 [JP] Japan ................... 58-230643

[51] Int. Cl.$^4$ .................. H04N 1/00; H04N 1/40; H04N 1/10
[52] U.S. Cl. .................. 358/256; 358/283; 358/293; 382/10
[58] Field of Search ............. 358/256, 283, 294, 285, 358/287, 282, 280, 257, 284, 293; 382/48, 27, 10

[56] References Cited

U.S. PATENT DOCUMENTS 4,439,790 3/1984 Yoshida ..................... 358/256
4,504,969 3/1985 Suzuki et al. ............... 382/10
4,551,768 11/1985 Tsuchiya et al. ............ 358/283

Primary Examiner—Howard W. Britton
Assistant Examiner—John K. Peng
Attorney, Agent, or Firm—Fitzpatrick, Cella, Harper & Scinto

[57] ABSTRACT

An original reading apparatus has a reader and a printer. When original signals of a unit detection region of, for example, 4 bits (main scanning direction )×4 lines (subscanning direction) continuously represent a white region, an original is detected. Latch circuits latch original signals corresponding to four corners of an original, and AND gates calculate the AND products of these signals with corresponding data stored in RAMs to determine the original region.

12 Claims, 10 Drawing Figures

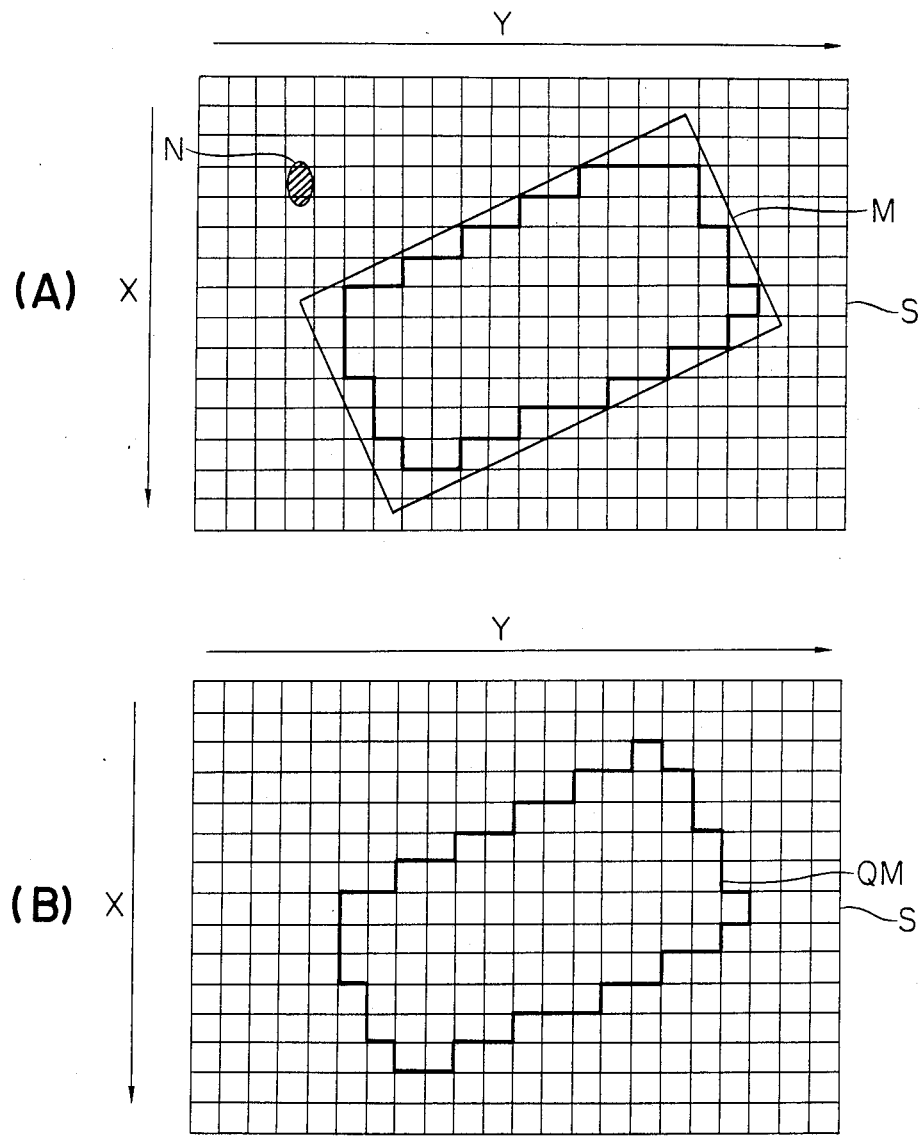

ORIGINAL READING APPARATUS WITH POSITIONING CHECK

BACKGROUND OF THE INVENTION

1. Field of the Invention

The present invention relates to an original reading apparatus to be used in a facsimile system, an electronic file or a copying machine.

2. Description of the Prior Art

An image processing system has been proposed for electrically processing an image and displaying, printing or filing the image information. In order to input image information to be processed in such a system, an original image must be photoelectrically read and the image must be converted into electrical signals.

For this purpose, an original reading apparatus is generally used which employs an image sensor such as a CCD so as to read an image of an original placed on an original table. In an original reading apparatus, there is a demand for a multifunctional image reading apparatus having a function of printing image information always at the center of a recording medium for an image on any position of an original table, a function for suitably changing a magnification of a reproduced image in accordance with the sizes of the original and the recording medium, and so on. In order to provide such a multifunctional image processing apparatus, the position and size of an original placed on the original table must be detected. Such an apparatus is disclosed, for example, in commonly-assigned application (U.S. Ser. No. 539,461).

In this apparatus, a CCD is used as a line sensor as an image reading means to convert an original image into electrical signals, thereby reading image information. The position and size of an original placed on the original table are detected in accordance with a contrast difference between a portion of the original table on which the original is placed (original region) and a portion thereof on which no original is placed (non-original region). A signal corresponding to a black region is obtained corresponding to the non-original region, and a white region of the original is detected as the original region, so that the original and non-original regions can be discriminated. A counter for counting the output bit number in the main scanning direction from the line sensor and another counter for counting the line number in the subscanning direction are started in synchronism with the reference position of the original table. The counts in the main and subscanning directions obtained upon detection of a white signal of the original region are held or latched so as to allow detection of the position of the original placed on the original table.

FIG. 1 is a schematic representation illustrating the original reading method in the application (U.S. Ser. No. 539,461) referred to above. Referring to FIG. 1, an original M is placed on an original table S. The original M is read in the reading direction of the line sensor (main scanning direction) X. The original table S is scanned in the subscanning direction Y. The original scanning is performed with reference to a reference position SP.

The position and size of the original M can be detected in accordance with a white signal corresponding to point P1 on the original M which is detected first, a white signal corresponding to point P2 which is closest to the reference point SP along the main scanning direction X, a white signal corresponding to point P3 farthest from the reference position SP along the main scanning direction X, and a white signal corresponding to point P4 of the original M which is detected last.

In this apparatus, an erroneous discrimination of the original region can be caused by a noise signal superposed on an image signal obtained by the reading operation of the line sensor, a white signal obtained due to the presence of a scratch on an original cover for keeping the original on the original table in position, contamination of the original table, or external light (to be referred to as noise components hereinafter). If such an erroneous discrimination of the original region can be prevented, the reliability of the apparatus can be improved further and the automatic recognition the original can be effectively performed.

SUMMARY OF THE INVENTION

The present invention has been made in considerration of this and has as its object to provide a highly reliable original reading apparatus which can reliably detect a position or size of an original and which reduces noise components from an image signal to prevent an erroneous discrimination of an original region.

It is another object of the present invention to provide an original reading apparatus which can detect a size or position of an original using a sensor for original image reading.

It is still another object of the present invention to provide an image reading apparatus suitably adapted in a facsimile system, an electronic file or a digital copying machine for automatically performing optimal image processing in accordance with an original size or position.

The above and other objects, features and advantages of the present invention will become apparent from the following description taken in conjunction with the accompanying drawings.

BRIEF DESCRIPTION OF THE DRAWINGS

FIGS. 4(A) and 4(B) are representations for explaining the reading operation of the original region in an image reading apparatus according to the present invention;

DETAILED DESCRIPTION OF THE PREFERRED EMBODIMENTS

The present invention will be described in detail with reference to the accompanying drawings.

Figure 2:
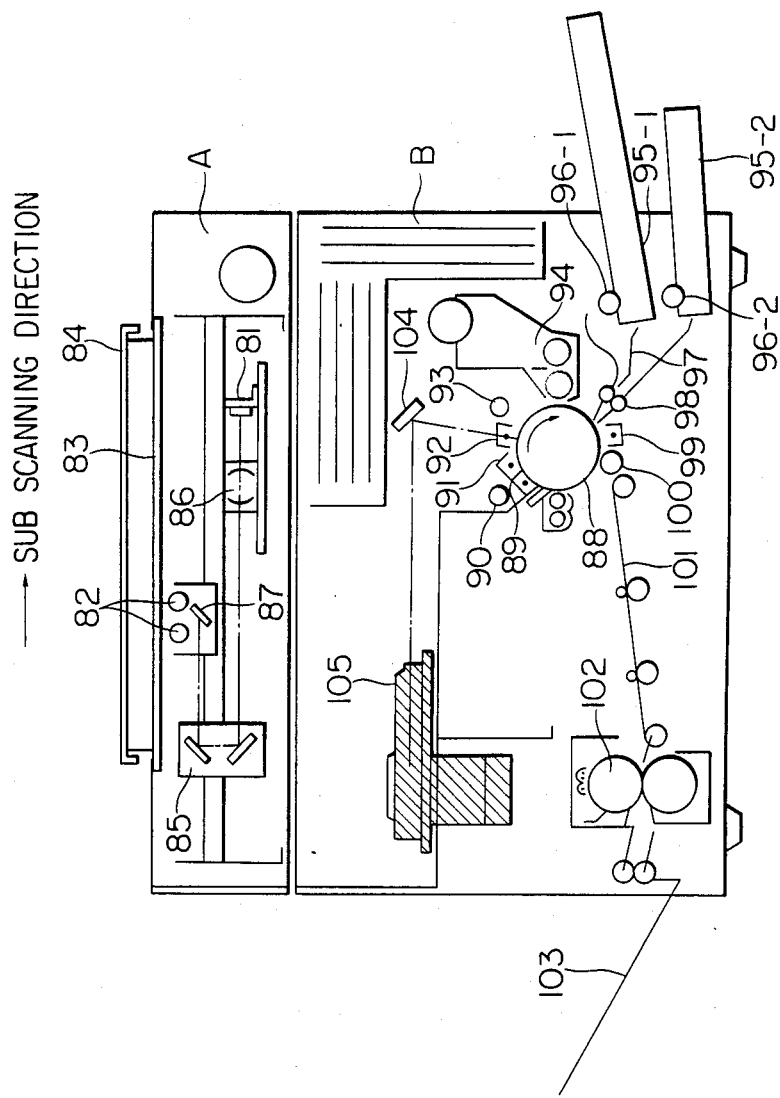
FIG. 2 is a view showing the construction of a digital copying machine to which the present invention can be applied.

FIG. 2 is a view showing the construction of a digital copying machine to which the present invention can be applied. A reader A reads an original to be copied by photoelectric conversion. A printer B prints an image on a recording medium or a printing medium in accordance with an image signal from the reader A. In the reader A, an original to be read is placed facing downward on an original table 83 comprising a transparent glass plate. The original is pressed lightly onto the original table 83 by an original cover 84. The image surface of the original is illuminated by fluorescent lamps 82, and reflected light therefrom is focused on a surface of a CCD 81 through mirrors 85 and 87 and a lens 86. The mirrors 87 and 85 are moved at a relative speed of 2:1. This optical system is subjected to PLL control by a DC servo motor and is moved from the left to the right (subscanning). The moving speed of the optical system is 180 mm/sec in the one-to-one copy mode during the forward movement in which the original is illuminated with light. The moving speed of the optical system is 468 mm/sec in the one-to-one copy mode during the return movement. The resolution in the subscanning direction is 16 lines/mm. The sizes of originals which can be processed are A5 to A3. Originals of A5, B5 and A4 sizes are placed on the original table 83 having their long sides aligned along the longitudinal direction of the table. Originals of B4 and A3 sizes are placed on the original table 83 having their short sides aligned with the transverse direction of the table.

A scan width along the main scanning direction corresponds to the width 297 mm (short side) of an A4 size original. In order to provide a resolution of 16 pel/mm, the CCD 81 must have at least 4,752 (=297×16) bits.

Referring to FIG. 2, the printer B below the reader A will be described below. Bit-serial signals from the reader A are supplied to a laser scanning optical system unit 105 of the printer B. The unit consists of a semiconductor laser, a collimator lens, a rotary polyhedral mirror, an FΘ lens, and an inclination correction optical system. An image signal from the reader A is applied to the semiconductor laser and subjected conversion into a light beam. The diverged laser beam obtained is collimated into parallel beams by the collimator lens. The parallel laser beams are irradiated onto the polyhedral mirror, thereby scanning the laser beams on a photosensitive body 88. An electrostatic latent image corresponding to the original image is formed on the photosensitive body 88. The polyhedral mirror is rotated at 2,600 rpm. The scanning width is about 400 mm and the effective image width corresponds to the width 297 mm of an A4 size original. A signal applied to the semiconductor laser has a frequency of about 20 MHz. The laser beam from the unit irradiates the photosensitive body 88 through a mirror 104.

The photosensitive body 88 can comprise, for example, a three-layered body consisting of a conductive layer, a photosensitive layer, and an insulating layer. Process components for forming an image on such a photosensitive body include a predischarger 89, a predischarger lamp 90, a primary charger 91, a secondary charger 92, a front surface exposure lamp 93, a developing unit 94 for visualizing the latent image on the body 88, paper feed cassettes 95-1 and 95-2 for storing paper sheets of different sizes, pick-up rollers 96-1 and 96-2 selectively driven in accordance with an original size or a magnification, a paper feed guide 97, register rollers 98, a transfer charger 99 for transferring the image on the photosensitive body 88 onto a recording paper sheet, a separation roller 100, a convey guide 101, a fixing unit 102, and a tray 103 for receiving the recording paper sheet with the image. The speed of the photosensitive body 88 and the convey system is 180 mm/sec which is the same as that during the forward movement of the optical system unit 105 of the reader A. Therefore, when copies of A4 size are to be produced with a combination of the reader A and the printer B, the copy speed is 30 copies per minute.

The copying machine according to the present invention has an intelligence such as image editing. The intelligence may have a function of enlarging/reducing an image at a magnification falling within a range of 0.5 to 2.0, a trimming function for extracting a specific region of the image, a moving function for moving the trimmed image portion to any position on the copy sheet, and a function of recognizing the original placed on the original table.

In the description of the embodiment to follow, the present invention is applied to a digital copying machine. However, it is to be understood that the present invention can be similarly applied to a facsimile system, an electronic file or the like.

Figure 3:
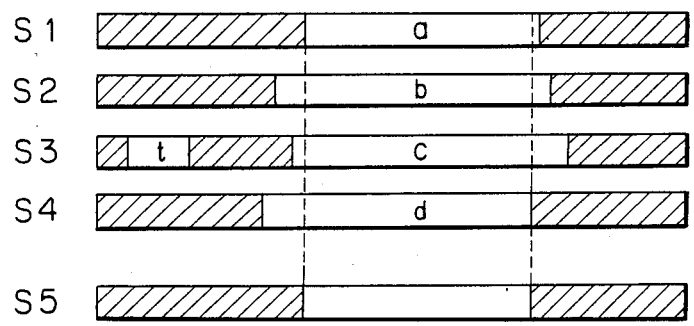
FIG. 3 is a diagram for explaining the noise reduction according to the present invention.

FIG. 3 is a representation for explaining noise reduction in original recognition according to the present invention. In this embodiment, an AND product of image information for several consecutive main scanning lines is calculated to recognize a continuous state of the image signal along the subscanning direction Y. As shown in FIG. 3, an AND product of image signals S1 to S4 obtained by four consecutive main scanning operations is calculated. In each of the image signals S1 to S4, a hatched portion is a black signal corresponding to a non-original region, and portions a to d are white signals corresponding to an original region. A white signal t is obtained from the non-original region due to a noise component. When an AND product of the signals S1 to S4 of the four lines is calculated, a signal S5 is obtained. Therefore, an erroneous discrimination of the portion of the signal t as the original region can be prevented.

FIG. 4 is a representation illustrating the reading operation of the original region. Small squares (blocks) on the original table S are detection units of the original region. Referring to FIG. 4(A), a hatched portion N is a noise component.

As shown in FIG. 4(A), the original M placed on the original table S is quantized in the manner described with reference to FIG. 3 and detected as indicated by QM in FIG. 4(B). The position precision of the original M is determined by the critical numbers of the bits of the white signal in the main and subscanning directions over for detecting the original region. For example, when an AND product of image signals is calculated in units of 4 bits in both the main and subscanning directions, the minimum unit of original position detection is 4 bits of the image signals ×4 lines. Therefore, the noise component N which is smaller than such a detection unit is not discriminated as an original region, and original position detection processing can be performed stably.

Figure 5B:
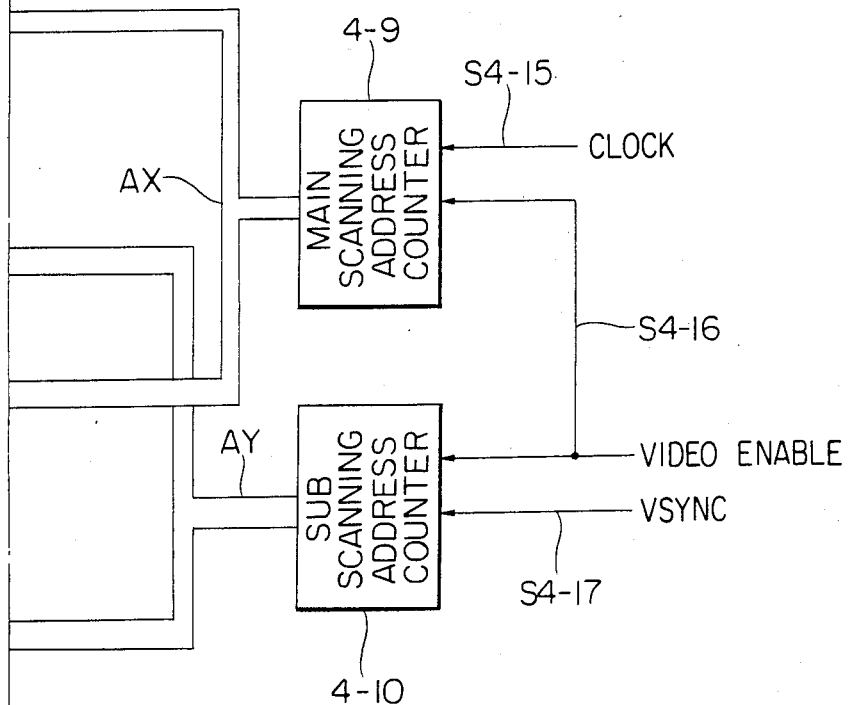
FIG. 5, consisting of FIGS. 5A and 5B, is a block diagram showing an example of the configuration of an original recognition circuit in the original reading apparatus according to the present invention.
Figure 5:
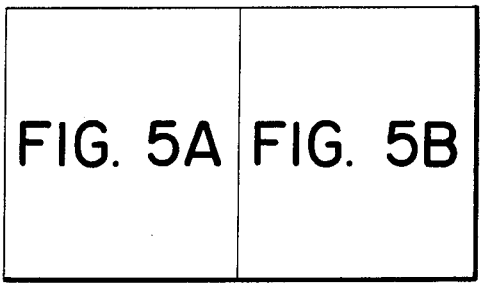
Figure 5A:
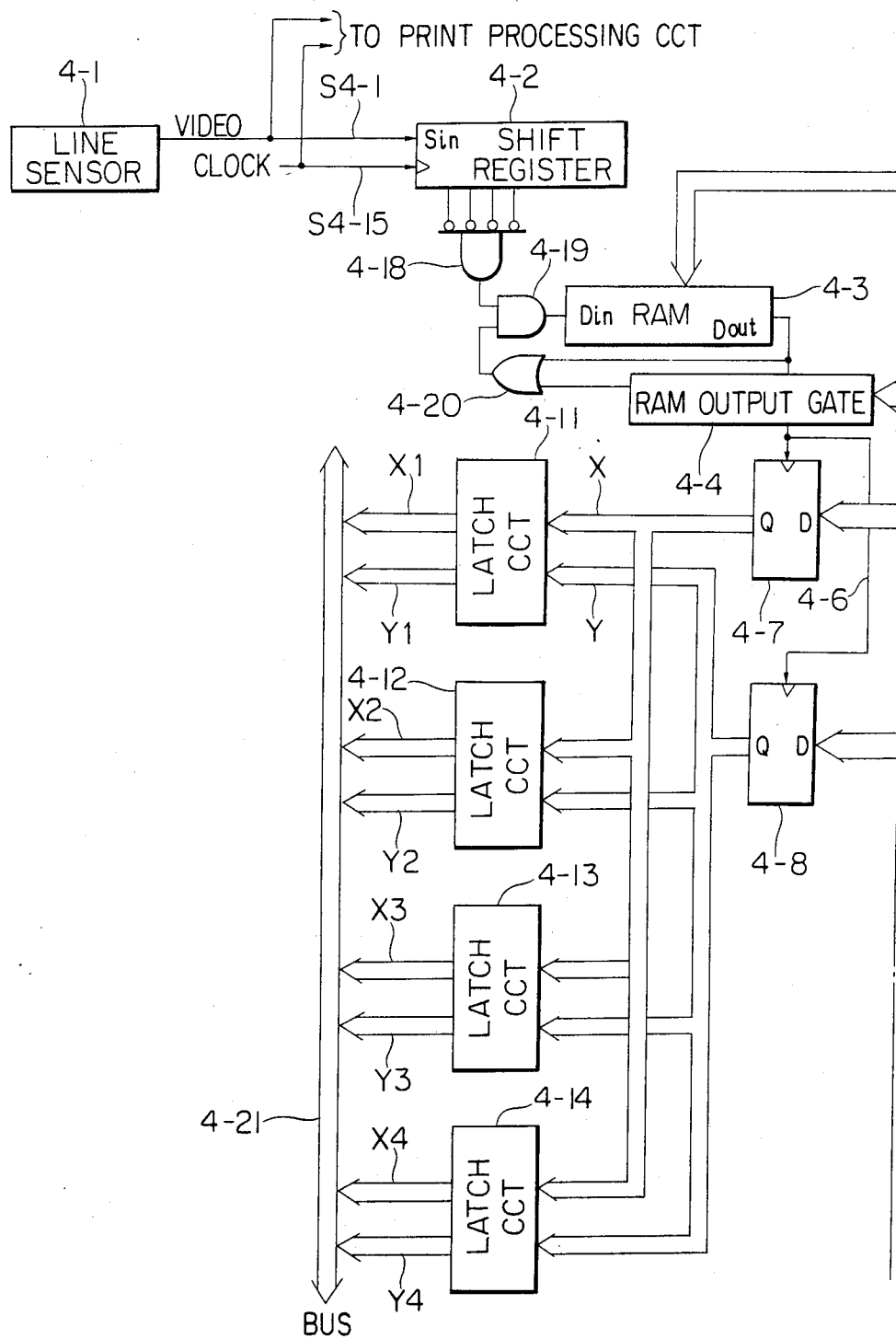

FIG. 5 shows one example of a configuration of an original recognition circuit in the original reading apparatus for performing such processing as described above. This circuit receives an image (video) signal S4-1 obtained by digitizing an output from a line sensor 4-1 such as a CCD at a predetermined threshold value, a video clock signal S4-15 synchronized with each pixel of the signal S4-1, a video enable signal S4-16 indicating a read start of a main scanning line, and a vertical sync signal VSYNC indicating the input of a 1-page video signal S4-11 from the original table reference position SP. In this embodiment, the white signal corresponds to level "0" and the black signal corresponds to level "1".

The video signal S4-1 from the line sensor 4-1 and the clock signal S4-15 are also supplied to a print processing circuit. The print processing circuit performs a predetermined processing operation and supplies a corresponding signal to the laser scanning optical system unit 105 of the printer B shown in FIG. 2.

A shift register 4-2 serves to detect that a continuous white signal is detected along the main scanning direction X. In this embodiment, the shift register 402 detects a continuous white signal (signal "0") of 4 bits. A RAM 4-3 stores an AND product of an image signal of one line supplied to a terminal Din from the shift register 4-2. In cooperation with gates 4-18 to 4-20, the RAM 4-3 performs read modify write processing and stores an AND product obtained for image information of several lines. A RAM output gate 4-4 receives a signal stored in the RAM 4-3 from its terminal Dout, and supplies an address latch signal to a position detector consisting of latch circuits 4-7 and 4-8.

A main scanning address counter 4-9 is initialized by a video enable signal S4-16 and counts video clock signals S4-15 so as to produce an address signal AX on the original table along the main scanning direction X. A subscanning address counter 4-10 is initialized by a signal S4-17 and counts video enable signals S4-16 from the original table reference position SP so as to produce an address signal AY on the original table along the subscanning direction Y.

In accordance with an original detection signal S4-6 from the gate 4-4, the main scanning address signal AX and the subscanning address signal AY are latched in the latch circuits 4-7 and 4-8.

Latch circuits 4-11 to 4-14 are latch circuits employed as coordinate discriminators. The latch circuit 4-11 latches an address corresponding to an original signal at a point first detected during scanning. Thus, the latch circuit 4-11 latches addresses (X1, Y1) corresponding to the point P1 in FIG. 1. The latch circuit 4-12 latches an address corresponding to an original signal at a point on the original table closest to the reference position SP along the main scanning direction X. Thus, the latch circuit 4-12 latches addresses (X2, Y2) corresponding to the point P2 in FIG. 1. The latch circuit 4-13 latches an address corresponding to an original signal at a point farthest from the reference position SP along the main scanning direction X. Thus, the latch circuit 4-13 latches addresses (X3, Y3) corresponding to the point P3 in FIG. 1. The latch circuit 4-14 latches an address corresponding to an original signal at a point scanned last. Thus, the latch circuit 4-14 latches addresses (X4, Y4) corresponding to the point P4 in FIG. 1.

The original recognition operation with the circuit of the configuration as described above will be described below. As described above, the shift register 4-2 and the gate circuit 4-18 connected thereto calculate an AND product of the continuous 4-bit video signal. When the 4-bit video signal represent all white or level "0", the gate circuit 4-18 produces a signal "1". Thereafter, the AND product obtained is written in the RAM 4-3 in accordance with the address signal AX which changes for every four clocks of the video clock signal S4-15. Thus, the presence/absence of the original can be determined in units of 4 bits along the main scanning direction. In this manner, data on the presence/absence of the original in units of lines along the main scanning direction X is stored in the RAM 4-3 and is read out therefrom when the data for the next line is written. The gate circuit 4-19 calculates an AND product of the data from the gate circuit 4-18 and that from the RAM 4-3 and writes the obtained result in the RAM 4-3 again. This processing is repeated to write AND products representing the presence/absence of data for 4 lines in the RAM 4-3.

Figure 6:
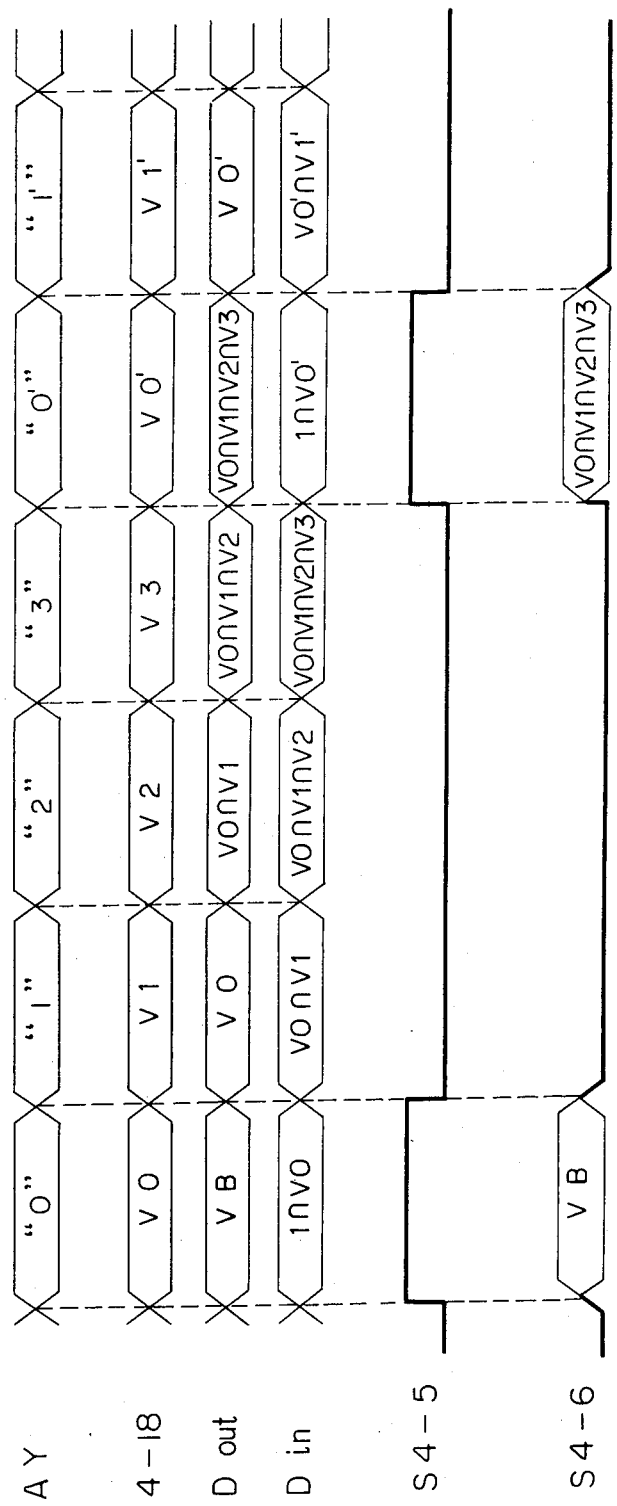
FIG. 6 is a timing chart showing the states of the signals at the respective parts in the apparatus shown in FIG. 5.

FIG. 6 shows a timing chart of signals at respective parts associated with such processing. The operation of each part will be described with reference to the timing chart of FIG. 6. "0", "1", "2", "3", "0'" and so on are addresses AY along the subscanning direction Y. Data V0, V1, V2, V3, V0' and so on represent the corresponding AND products of the video signals S4-1 of the respective lines in the main scanning direction. VB is an AND product obtained before input of the data V0.

The output gate 4-4 enables a signal 4-5 to "1" level for each four lines. Then, the output from the OR gate 4-20 is enabled, and an output the same as that from the gate circuit 4-18 is produced from the AND gate 4-19 and written in the RAM 4-3. Data which is not subjected to AND product calculation with data in the RAM 4-3 is written in the RAM 4-3 for each four lines to initialize the contents of the RAM 4-3. An AND product of the data supplied from the gate circuit 4-18 during the 3-line period corresponding to the disabled state of the signal 4-5 and data already stored in the RAM 4-3 is calculated. The obtained AND product is written in the RAM 4-3, thereby obtaining an AND product of 4 continuous lines along the subscanning direction Y. When the signal 4-5 is enabled again, the output gate 4-4 of the RAM 4-3 produces the data representing the presence/absence of original which has been stored therein onto a signal line 4-6. When the data supplied onto the signal line 4-6 contains an original detection signal, the original position addresses AX and AY are latched in the latch circuits 4-7 and 4-8.

Since the data representing the presence/absence of the original which is produced onto the signal line 4-6 is produced once in each 4 subscanning operations, the address data latched in the latch circuits 4-11 to 4-14 are quantized as shown in FIG. 4(B). This data representing the presence/absence of the original is equivalent to data which is obtained by calculating an AND product of image data of a fundamental region consisting of (4 lines along the subscanning direction)×(4 bits of the video clock signal S4-15 along the main scanning direction).

Assume a rectangle including a region determined by 4 points latched in the latch circuits 4-11 to 4-14. Each side of this rectangle is assumed to be parallel to the main or subscanning direction. Since this rectangle includes all the image on the original, the size of the recording sheet is selected in accordance with the size of the rectangle. That is, one of two cassettes of the printer B is selected. Then, an image on the original can be printed on a recording sheet of a suitable size.

In order to prevent printing of a spot or the like on the original cover on a recording sheet, the original position on the original table is recognized in accordance with the values of the four points latched in the latch circuits 4-11 to 4-14. Then, the video signal obtained by reading the region other than the original region by the CCD is gated to prevent transmission of erroneous data to the printer and to print the original data in accordance with the video signal obtained by reading only the original image.

The original size is discriminated by the values of the four points latched in the latch circuits 4-11 to 4-14. The discrimination result is compared with the size of the recording paper sheet set in the printer. The magnification is automatically modified so that the original image can be printed within the area of the recording sheet.

Various processing procedures using original recognition data are described in the above-mentioned application U.S. Ser. No. 539,461 and can also be used in this invention.

Figure 7:
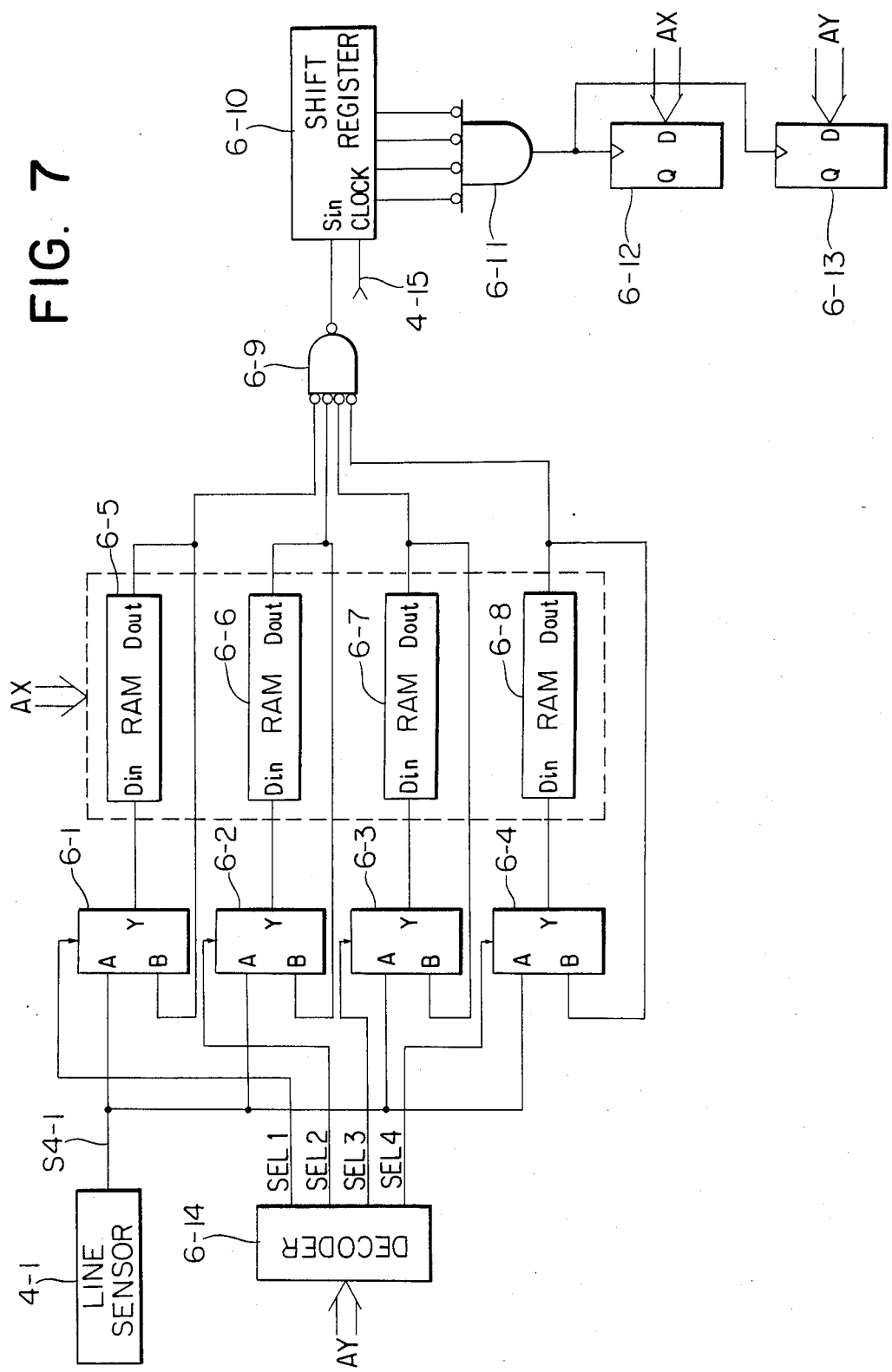
FIG. 7 is a block diagram showing another configuration of the original recognition circuit according to the present invention.

FIG. 7 shows another configuration of the original recognition circuit according to the present invention. In this embodiment, line memories numbering the same as that of the number of bits for detecting a continuous original signal are incorporated for the subscanning direction. Then, the circuit has a capacity of noise reduction equivalent to that of the circuit shown in FIG. 4 and can also reduce the quantization errors of addresses. In this embodiment, in order to detect continuous 4-bit×4-line original signals, RAMs 6-5 to 6-8 can each store image information of one line.

Selectors 6-1 to 6-4 are connected to the output side of a decoder 6-14. In response to the subscanning address signal AY, the decoder 6-14 sequentially supplies select signals SEL1 to SEL4 to the selectors 6-1 to 6-4, respectively. The selectors 6-1 to 6-4 switch the select inputs to the RAMs 6-5 to 6-8 in accordance with the input select signals SEL1 to SEL4.

The RAM selected by a corresponding one of the selectors 6-1 to 6-4 stores the video signal 4-1 corresponding to the address signal AY. More specifically, the decoder 6-14 switches the select signals SEL1 to SEL4 such that when a video signal of a given line is stored in the RAM 6-5, a video signal of the next line is stored in the RAM 6-6, a video signal of the following line is stored in the RAM 6-7, and a video signal of a still next line is stored in the RAM 6-8. The outputs from the respective RAMs 6-5 to 6-8 are fed back to the corresponding selectors 6-1 to 6-4 to be stored in the RAMs 6-5 to 6-8. Thus, RAMs which are not selected by the corresponding selectors fetch the readout data read out from themselves and store them.

In this manner, video signals supplied to a gate 609 are updated for each line. An output signal from the gate 6-9 which has detected continuous original signals along the subscanning direction is supplied to a shift register 6-10. A gate 6-11 detects a continuous 4-bit original signal along the main scanning direction. An output signal from the gate 6-11 represents the continuous 4-bit×4-line original signals along the main and subscanning directions and therefore is data representing the presence/absence of the original for each bit and line as in the case of the circuit shown in FIG. 5.

Figure 1:
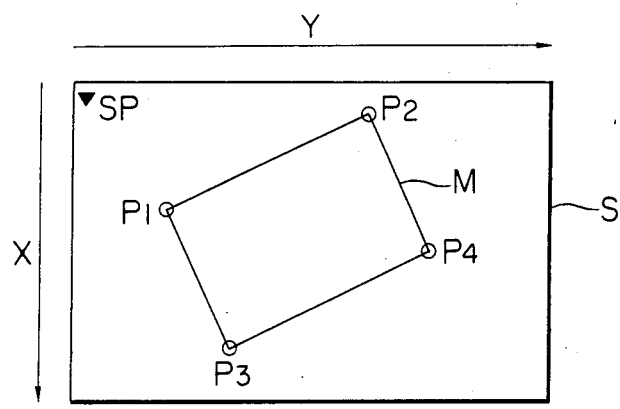
FIG. 1 is a representation showing the operation of detecting an original position.

In response to an output signal from the gate 6-11, address signals corresponding to each bit and line are latched by latch circuits 6-12 and 6-13, thereby detecting the positions of the points P1 to P4 in FIG. 1 (A) by coordinate discriminators (not shown) similar to the latch circuits 4-11 to 4-14 shown in FIG. 5.

In the circuit shown in FIG. 7, continuous 4-bit×4-line original data in the main and subscanning directions is detected so as to prevent an erroneous detection of an original region due to the noise component. Furthermore, since a fundamental block of 4 bits×4 lines is shifted in units of single bits and lines, quantization errors during address detection can be reduced to the minimum.

In the embodiments described above, the AND products of the pixel data of a fundamental detection unit are calculated in both the main and subscanning directions. However, noise reduction can be similarly performed even if such calculation of AND products is performed in only one of the main and subscanning directions.

As described above, it is detected whether or not image information of pixels of a fundamental detection unit are all specific image information. Therefore, when the position and size of an original are detected, noise components can be removed, thereby providing an original reading apparatus capable of highly reliable original recognition processing.

In the above embodiment, the original is fixed in position, and the optical system is moved for subscanning. However, the present invention is similarly applicable to a system wherein the optical system is fixed in position and the original is moved.

What is claimed is:

1. An original reading apparatus comprising:
   reading means for reading an original document and for producing an image signal;
   detecting means for detecting an image signal representing the original document from the image signal signals supplied from said reading means, according to the status of plural image signals in a predetermined two-dimensional area of a predetermined size, wherein said detecting means is adpated to detect that the plural signals contained in an area of a predetermined size are signals representing white images; and
   discriminating means for discriminating a characteristic relating to the original document in accordance with the detection result of said detecting means, the discriminated characteristic being one of the group consisting of: (i) a position of the original document, and (ii) a size of the original document.

2. An original reading apparatus according to claim 1, wherein said reading means is composed of a line sensor for reading the original document line by line.

3. An original reading apparatus according to claim 1, wherein said reading means is composed of a line sensor for reading the original document line by line.

4. An original reading apparatus comprising:
   means for reading an original image by electrically main scanning an original document line by line and by mechanical sub-scanning;
   first detecting means for detecting that a specific signal is continuously produced for a predetermined number of pixels along a main scanning direction from said reading means;
   second detecting means for detecting that a specific signal is continuously produced for a predetermined number of pixels along a sub-scanning direction from said reading means; and
   means for discriminating a characteristic relating to the original document in accordance with output from said first and second detecting means, the discriminated characteristic being one of the group consisting of: (i) a position of the original document, and (ii) a size of the original document.

5. An original reading apparatus according to claim 4, wherein said first and second detecting means detect continuity of signals representing a white image.

6. An original reading apparatus according to claim 4, further comprising a platen on which the original document is to be placed.

7. An original reading apparatus according to claim 4, wherein said reading means is composed of a line sensor ior reading the original document line by line.

8. An image processing apparatus comprising:
a platen on which an original document is placed;
sensor means for receiving light from said platen to produce an electrical signal corresponding to said light;
detecting means for detecting an electric signal representing the original document from the electric signal supplied from said sensor means, according to the status of plural electric signals in a predetermined two-dimensional area of a predetermined size, wherein said detecting means is adapted to detect that the plural signals contained in an area of a predetermined size are signals representing white images; and
discriminating means for discriminating a characteristic relating to the original document and said platen in accordance with the detection result of said detecting means, the discriminated characteristic being one of the group consisting of: (i) a position of the original document, and (ii) a size of the original document.

9. An image processing apparatus according to claim 8, wherein said sensor means is adapted to produce an image signal representing the image of the original document.

10. An image processing apparatus comprising:
a platen on which an original document is placed;
means for scanning the original document on said platen by electrically main scanning the original document line by line and by mechanical sub-scanning;
first detecting means for detecting that a specific signal is continuously produced for a predetermined number of pixels along a main scanning direction from said scanning means;
second detecting means for detecting that a specific signal is continuously produced for a predetermined number of pixels along a subscanning direction from said scanning means; and
means for discriminating a characteristic relating to the original document on said platen in accordance with outputs from said first and second detecting means, the discriminated characteristic being one of the group consisting of: (i) a position of the original document, and (ii) a size of the original document.

11. An image processing apparatus according to claim 10, wherein said first and second detecting means detects continuity of signals representing a white image.

12. An image processing apparatus according to claim 10, wherein said scanning means is adapted to produce an image signal representing the image of the original document.

* * * * *

UNITED STATES PATENT AND TRADEMARK OFFICE
CERTIFICATE OF CORRECTION

PATENT NO. : 4,686,577
DATED : August 11, 1987
INVENTOR(S) : SHINOBU ARIMOTO

It is certified that error appears in the above-identified patent and that said Letters Patent is hereby corrected as shown below:

COLUMN 2

Lines 18-19, "considerration" should read --consideration--.

COLUMN 3

Line 39, "subjected" should read --subjected to--.

COLUMN 7

Line 38, "a still" should read --the--.

COLUMN 8

Lines 31-32, "adpated" should read --adapted--.
    Line 61, "output" should read --outputs--.

UNITED STATES PATENT AND TRADEMARK OFFICE
CERTIFICATE OF CORRECTION

PATENT NO. : 4,686,577

DATED : August 11, 1987

INVENTOR(S) : SHINOBU ARIMOTO

It is certified that error appears in the above-identified patent and that said Letters Patent is hereby corrected as shown below:

COLUMN 9

Line 6, "ior" should read --for--.

Signed and Sealed this

Twenty-ninth Day of December, 1987

Attest:

DONALD J. QUIGG

*Attesting Officer*  *Commissioner of Patents and Trademarks*